(12) United States Patent
Petr et al.

(10) Patent No.: US 7,856,385 B2
(45) Date of Patent: Dec. 21, 2010

(54) SYSTEM AND METHOD FOR MANAGEMENT AND PROCESSING OF BANKRUPTCY CLAIMS AND PAYMENTS

(75) Inventors: Elizabeth I. Petr, Dallas, TX (US); Eric L. Donowho, Richardson, TX (US); Robert W. Brasiel, Pleasant Hill, CA (US); Rajinder M. Singh, Berkeley, CA (US)

(73) Assignee: National Default Exchange LP, Addison, TX (US)

( * ) Notice: Subject to any disclaimer, the term of this patent is extended or adjusted under 35 U.S.C. 154(b) by 0 days.

(21) Appl. No.: 11/852,086

(22) Filed: Sep. 7, 2007

(65) Prior Publication Data

US 2009/0070245 A1 Mar. 12, 2009

(51) Int. Cl.
*G06Q 40/00* (2006.01)

(52) U.S. Cl. .............................. 705/35; 705/37; 705/38; 705/40

(58) Field of Classification Search ........................ None
See application file for complete search history.

(56) References Cited

U.S. PATENT DOCUMENTS

| | | | |
|---|---|---|---|
| 5,285,382 A * | 2/1994 | Muehlberger et al. | 705/17 |
| 5,966,700 A * | 10/1999 | Gould et al. | 705/38 |
| 6,192,347 B1 * | 2/2001 | Graff | 705/36 R |
| 6,654,727 B2 * | 11/2003 | Tilton | 705/36 R |
| 6,898,574 B1 * | 5/2005 | Regan | 705/38 |
| 7,249,089 B2 * | 7/2007 | Mendizabal et al. | 705/37 |
| 7,340,424 B2 * | 3/2008 | Gang et al. | 1/1 |
| 7,403,942 B1 * | 7/2008 | Bayliss | 707/5 |
| 2003/0078881 A1 * | 4/2003 | Elliott et al. | 705/39 |
| 2004/0215555 A1 * | 10/2004 | Kemper et al. | 705/38 |
| 2004/0225610 A1 * | 11/2004 | Newsom | 705/40 |
| 2005/0144119 A1 * | 6/2005 | Monsen et al. | 705/38 |
| 2005/0278246 A1 * | 12/2005 | Friedman et al. | 705/38 |

* cited by examiner

*Primary Examiner*—Thomas Dixon
*Assistant Examiner*—Gerald C Vizvary
(74) *Attorney, Agent, or Firm*—Dicke, Billig & Czaja, PLLC

(57) ABSTRACT

A system and method provides electronic management and processing of bankruptcy-related claims and payments. The method includes receiving loan servicer data from a loan servicer portfolio. The method also includes receiving trustee data from a repository of trustee information. The method includes comparing one or more data fields related to the claims from the service provider data to corresponding one or more data fields related to the claims from the trustee data and assigning a score to the comparison results for the data fields related to the claims based on one or more business rules. The method includes calculating the total score for the comparison results for the claims, designating the claim as being valid if the total score for the claim is greater or equal to a predetermined value, and designating the claim as being invalid if the total score for the claim is less than a predetermined value.

22 Claims, 4 Drawing Sheets

SYSTEM AND METHOD FOR MANAGEMENT AND PROCESSING OF BANKRUPTCY CLAIMS AND PAYMENTS

FIELD OF THE INVENTION

The invention relates generally to bankruptcy related loans, claims and payments, and more specifically to a system and method for management and processing of bankruptcy related loans, claims and payments.

BACKGROUND OF THE INVENTION

To obtain a loan from a lender, a borrower executes a loan agreement and a security instrument that often secures collateral such as automobile, real estate or improvements the borrower purchased with the funds obtained from the lender. The term "borrower" is used interchangeably with the term "debtor" and the term "lender" is used interchangeably with the term "creditor".

If the debtor fails to perform any of the debtor's obligations under the terms and conditions of the loan agreement, the debtor is in default. In the case of a mortgage loan, a typical default arises if the debtor fails to pay the monthly mortgage payment due under the loan agreement. Upon default, and so long as the creditor follows debt collection procedures per the terms of the mortgage document and complies with federal and state laws, the creditor can cause the property securing the loan agreement to be sold at a foreclosure sale. Since foreclosure is a harsh remedy to be resorted to only under the direst circumstances, failure to comply with even the most minute federal or state consumer protection, debt collection, property, title and business statutes related to the enforcement of security interest can result in a wrongful foreclosure or class action lawsuit with negative economic consequences for the lender.

Because of the legal issues involved with enforcing a loan agreement, most creditors retain a loan servicer to be their duly authorized agent or representative to handle the day to day loan level administrative details related to a loan. When a loan goes into default the loan servicer, as the creditor's representative, initiates a debt collection process. Depending on the creditor and/or the extent of the default, legal counsel is retained to continue the debt collection.

At any time during the life of the loan, the debtor may file bankruptcy, which forces the creditor to (a) cease any collection activities, including a foreclosure proceeding, repossession or otherwise suffer severe economic sanctions from the bankruptcy court, and (b) requires the creditor to deal with the debtor's default under the auspices of the bankruptcy court and the federal bankruptcy code. If the creditor seeks to enforce its loan instrument or security agreement that is in default, the creditor must timely file a proof of claim ("POC"), also referred to as "claim", in the bankruptcy court.

In a typical bankruptcy, there may be several creditors involved for a single debtor in bankruptcy, wherein each creditor may file one or more claims against the debtor. The court appoints a trustee to manage the claims against the debtor. The trustee collects payments from the debtor and distributes the payments to the creditors in order to satisfy the claims against a loan, according to the bankruptcy plan confirmed by the bankruptcy court. There are approximately 200 trustees nationwide that collect and distribute debtor payments to satisfy bankruptcy claims filed by creditors in approximately 284 bankruptcy courts.

Since the trustees are responsible for managing the claims, they are required to ensure that their books and records related to the claims are properly maintained. The trustees ensure that payments made to the trustee by the debtors are properly distributed to the correct creditors as confirmed by the court.

The loan servicer, on behalf of the creditor, tracks and maintains the loan and claims during the term of a bankruptcy. The loan servicer ensures that payments received from the trustee and from the debtor are properly applied to the correct loan and associated claim, and that the books and records reflect the correct state of payments.

In order to properly service the claims, the loan servicer must match the claims to one or more specific loans. Since there is no common identifier for matching a claim to a loan, the process of matching can be labor intensive.

During the term of the bankruptcy, the trustee sends a payment to the creditor by a check (sometimes via ACH). The trustee typically encloses a payment voucher with the check. The payment voucher provides information about the payment, including bankruptcy case number and claim number, and sometimes includes the debtor name and corresponding account/loan number. The loan servicer is required to apply the payments to the debtor's loan in accordance with the bankruptcy court-confirmed plan.

In order to apply the payments to the debtor's account, the voucher and the check must be matched to the correct claim(s) and the corresponding loan(s). Unfortunately, the matching process is complicated because the claims may be related to different loan parts: a pre-petition payment, a post-petition on-going payment, an agreed order payment or an interest on arrears payment.

Also, the trustees are not required to adhere to a defined standard for voucher details nor are they required to apply common business definitions, (e.g. they often do not provide enough detailed information delineating the amounts for each loan and each claim), making the interpretation of the voucher detail difficult for the loan servicer to apply the correct amounts to the correct claim(s) and associated loan(s).

After the check is matched with the correct claim(s) and the corresponding loan(s) are identified, the payment must be applied according to the court-confirmed plan (e.g., payments applied to the correct loan part: pre-petition mortgage payments, court allowed fees and costs, interest on arrears, post petition on-going payments, etc). As will be apparent to those skilled in bankruptcy matters, the payment application in accordance with the court-confirmed plan may be quite different from how payments for a loan are typically applied such as being applied to the payments for the contractual amount due on the loan and any outstanding fees or costs associated with the loan General accounting methods are utilized by loan servicing systems. For example, each pay period, usually monthly for a mortgage loan, the next payment is due per the loan contract. Loan servicing systems typically do not allow for multiple concurrent contractual due dates as often required for the duration of the bankruptcy (which can be up to five years) where a loan is in default at any time at bankruptcy filing or a subsequent default during the bankruptcy. Some loan servicing systems have been modified to attempt to allow recordation and application of multiple loan parts which are concurrent due dates required during a bankruptcy, i.e., pre-petition arrearage due date, post petition on-going due date, post petition arrearage/agreed order due, or a possible additional agreed order due date.

The loan servicer must maintain distinct comprehensive records of payments as a result of possible delinquencies at the time of the bankruptcy filing (i.e., pre-petition arrearages) and payments due after the bankruptcy filing date (i.e., post petition on-going payments). Generally, the post-petition payments are considered current as of the first month after the filing of bankruptcy and the payments must be applied as if they were, even though a loan servicer's system may show the post-petition payments to be contractually delinquent. Once a bankruptcy is filed, the debtor is deemed to be current on his payments (monthly mortgage payment as an example) effective with the month following the bankruptcy petition date. The entire delinquency existing on the loan at the time of the bankruptcy petition filing is put into a lump sum and called the pre-petition arrearage. The amount is put into a repayment plan as confirmed by the bankruptcy court and administered by the trustee. The pre-petition arrearage is usually spread out in smaller payments through the life of the bankruptcy, up to five years. The loan servicer must keep track of these pre-petition payments and apply them, as they are received from the trustee, towards the monthly payments, fees and costs that were due at the time of the petition filing per the confirmed plan. In addition, the now "current" post petition on-going mortgage payment (in this example) are coming in as well from either the debtor directly or from the trustee in some jurisdictions. These payments must be applied to the debtor's account as current payments and reflected as such on the loan servicer's system and subsequent reporting mechanisms. This is true also for any additional delinquency that occurs with the post petition on-going payments in the form of a court ordered agreed order after the petition filing. The loan servicer's system must keep track of this third payment and its due date as well. Sanctions and penalties may be assessed by the bankruptcy court for failure to do so properly.

In most jurisdictions, the debtor makes post-petition 'current' on-going loan payments directly to the creditor, not to the trustee, but the debtor makes pre-petition payments to the trustee who is responsible for managing the pre-petition arrearages. However, in some jurisdictions, the trustee manages both pre-petition arrearages and post petition payments, as well as some post petition agreed order payments. In those jurisdictions where the trustee exercises control over both the pre-petition and post-petition payments, the trustee and the loan servicer must keep track of both pre-petition and post-petition payments and the loan servicer must identify and apply these payments in accordance with the court confirmed plan.

Further difficulties arise because, in the case of most mortgage loans, post petition on-going monthly payment amounts often change depending on, for example, escrow analysis or adjustable rate mortgages. If the monthly on-going payment amount changes, the trustee needs to adjust accordingly and remit the correct amount to satisfy the terms of the mortgage according to the contract between the debtor and the creditor. Some loans, as in the case of many mortgage loans, per the mortgage contract include in the monthly payment principal, interest and escrow payments for property taxes on the collateral home, as well as home insurance, mortgage insurance premiums, etc. Because property taxes and home owners insurance are usually subject to change each year, the contract allows for an analysis of the escrowed amount, it is usually done annually. Depending on the outcome of the escrow analysis, the monthly escrowed amount may stay the same, increase or decrease. The on-going monthly mortgage payment must change accordingly so as not to cause a gross overage or shortage in the debtor's escrow account. Similarly, adjustable rate mortgages, per the contract, allow for changes in the interest rate for certain periods of the life of the loan, causing the total monthly on-going payment to change depending on the new interest rate, usually annually. The change in the required remittance amount of the post petition on-going payment, if being administered by the trustee may result in problems and some jurisdictions require a court order to make any change to this amount as it changes the court confirmed plan.

Often during the bankruptcy period, disputes arise whether the debtor has made certain payments and/or whether the payments were actually applied to the correct claims or loan part: pre-petition, post petition or agreed order. At court hearings to resolve such disputes, bankruptcy judges and trustees often require reports showing accurate status of the payments and the claims. However, due to the foregoing problems, accurate reports of the status of the payments and the claims are often difficult to create.

There exist a need for a system and a method that provide a solution for the foregoing problems. There exists a need for a system and method that assists creditors and loan servicers to efficiently manage bankruptcy related loan payments and claims.

SUMMARY OF THE INVENTION

A system and method provides electronic management and processing of bankruptcy-related claims and payments. The method includes receiving loan servicer data from a loan servicer portfolio. The loan servicer data relates to one or more loans (e.g., mortgage loans, automobile loans, credit card loans) whose debtors are in bankruptcy and also relates to one or more claims filed by creditors against the debtors. The method also includes receiving trustee data from a repository of trustee information. The trustee data relates to the loans whose debtors are in bankruptcy and also relates to the claims filed by the creditors. The method includes comparing one or more data fields related to the claims from the service provider data to corresponding one or more data fields related to the claims from the trustee data and assigning a score to the comparison results for the data fields related to the claims based on one or more business rules. The method includes calculating the total score for the comparison results for the claims, designating the claim as being valid if the total score for the claim is greater or equal to a predetermined value, and designating the claim as being invalid if the total score for the claim is less than a predetermined value. The method includes identifying one or more claims filed against the debtor for a particular loan based on the results of the comparison. The method further includes generating payment instructions for the valid claims and providing the payment instructions to the loan servicer.

BRIEF DESCRIPTION OF THE DRAWINGS

The following detailed description of embodiments of the invention will be better understood when read in conjunction with the appended drawings. It should be understood, however, that the invention is not limited to the precise arrangements and instrumentalities shown herein. In the drawings, like reference numerals designate corresponding parts throughout the several views.

The present invention may take physical form in certain parts and arrangement of parts. For a more complete understanding of the present invention, and the advantages thereof, reference is now made to the following descriptions taken in conjunction with the accompanying drawings, in which.

DETAILED DESCRIPTION OF THE EMBODIMENTS OF THE INVENTION

Figure 1:
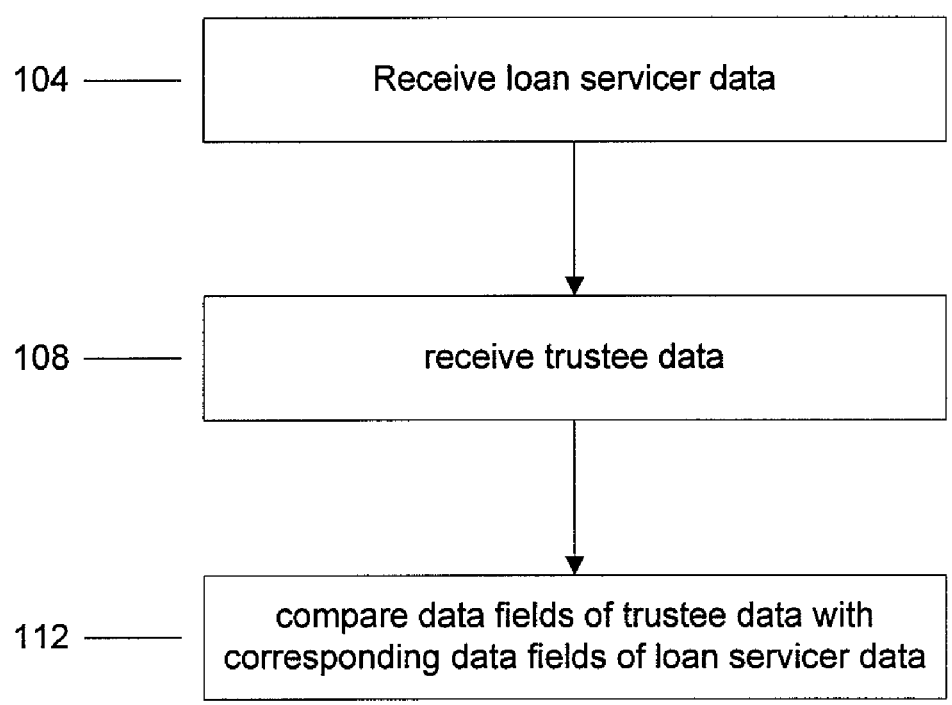
FIG. 1 is a flow diagram of the steps for electronic management and processing of bankruptcy-related claims and payments in accordance with one example embodiment.

It should be understood that any one of the features of the invention may be used separately or in combination with other features. It should be understood that features which have not been mentioned herein may be used in combination with one or more of the features mentioned herein. Other systems, methods, features, and advantages of the present invention will be or become apparent to one with skill in the art upon examination of the drawings and detailed description. These and other objects, features and advantages of the present invention will be more readily apparent when considered in connection with the following, detailed description of embodiments of the invention, which description is presented in conjunction with annexed drawings below.

The embodiments of the invention are described in connection with a system and method for management of bankruptcy-related loans, claims and payments. It will become obvious to those skilled in the art that the embodiments of the invention can be adapted or modified to process other types of claims and payments.

In one aspect, a system and method provides electronic management of bankruptcy-related claims and payments. The system maintains updated trustee claim and disbursement information, debtor payment or remittance information, and running total of claim balances on a regular basis. The system assists a creditor, a loan servicer and others to identify claims and trustee payments, track and maintain records related to payments and claims. The system and method also generates reports to assist a court or the trustee to resolve disputes related to the debtor payments and the claim balances.

In one aspect, the system automates, maintains and reconciles payments with one or more claims against a debtor. As will be understood by those skilled in the art, the payments are sent by the debtor to the trustee, and the trustee then forwards the payments to the loan servicer. The loan servicer applies the payments against one or more loans and one or more claims against the debtor. The system ensures that payments made by the debtor through the trustee during the course of the bankruptcy are identified and posting instructions are supplied to the creditor or loan servicer to allow for proper allocation to the appropriate pre-petition and post-petition accounts. In one embodiment, the pre-petition accounts and the post-petition accounts are reconciled with the loan servicer and the trustee records. The system generates a record of payment history associated with the claims payments. For example, a standardized, on-demand payment history report and reconciliation is created for presentation to the court and trustee.

In one embodiment, the system is connected to a loan servicer's computer network through a communications network such as the Internet. The system receives loan servicer data from a loan servicer portfolio. In one embodiment, the system receives an updated copy of the loan servicer's bankruptcy portfolio periodically, e.g., daily.

Because of the highly confidential nature of the data received from the loan servicer's portfolio, the system maintains a very high level of security during data transmission and data storage.

The loan servicer's bankruptcy portfolio includes loans in active bankruptcy status that are serviced by that loan servicer. As will be understood by those skilled in the art, a loan servicer's portfolio includes loans of varying size and makeup. A loan servicer, for example, might service, for example, a total of 100,000 loans out of which 3,300 may be in active bankruptcy proceedings. As will be understood by those skilled in the art, a loan servicer's portfolio includes loans in various statuses such as current, delinquent, in foreclosure, current bankruptcies. The loan servicer's portfolio might include different collateral types of loans, such as mortgages (conventional, FHA, VA, first lien, second lien), auto, secured, and unsecured loans. The loan servicer's portfolio might be comprised of loans in one particular state, e.g., Texas, or the portfolio might be comprised of loans made nationwide.

The loan servicer generally maintains an electronic file for a loan or borrower that is in active bankruptcy. The file includes data related to the loan and the corresponding claims as defined in a POC. For example, the file includes the loan number, the borrower's name, the borrower's social security number, the bankruptcy case number, and the trustee name, among other data fields. The system automatically receives the data from the loan servicer's file. In one embodiment, the system downloads the data from the loan servicer's file into a server. The data elements in the files are mapped at implementation of the initial conversion of loans when a servicer comes on to the system for the first time. Data elements, sometimes called data fields, from the servicer's system (that contain the information needed to compare with the trustee's information to determine which loans and claims are a match) must be mapped or linked to the data fields in the system. Determinations need to be made to ensure that both systems are interpreting the same information. When the servicer sends data, the system needs to interpret the data as it was intended.

In one embodiment, the system receives specific loan details from the loan servicer's portfolio, which are relevant to claims matching. Specifically, the system receives the POC (also referred to as the "claim") related information from the loan servicer's portfolio. The POC is a document filed by a creditor in a bankruptcy case. The POC identifies the debtor, lists the debt owed by the debtor to the creditor at the time of the filing of the bankruptcy petition, and provides the documents evidencing the debt. The debt is referred to as the pre-petition debt, and the claim is referred to as the pre-petition claim. The creditor files the POC in a bankruptcy court and provides a copy of the POC to the trustee.

The system reviews the claim and loan related information received from the loan servicer and the information related to the claim received from the trustee through a commercially available database in order to match the loan to one or more claims filed against the loan. Specifically, the system reviews the debtor's name, the creditor names, loan number, trustee name, claim amount, balance of claim remaining, type of claim and other related information in the POC. Based on the review, the system identifies one or more claims filed against a particular loan.

The system electronically receives trustee data relating to claims and loans that are in the loan servicer's portfolio from a commercially available database. Specifically, the system uploads the trustee information from a database of the National Data Center (NDC). As will be understood by those skilled in the art, NDC is a repository of trustee data. NDC has agreements with the majority of the chapter 13 trustees in the U.S. that have jurisdiction over 95% of all bankruptcy claims nationwide. NDC receives daily updates online from the trustees with data related to each of the debtors over whom they have jurisdiction for the collection and distribution of the debtor funds. The NDC stores the trustee data in NDC's database. NDC standardizes the format of the stored data elements of the trustee information for easier download and viewing of the information online.

As will be understood by those skilled in the art, the trustee maintains electronic files containing records of the claims that are administered by the trustee. These claims are filed by the creditors against the debtors in bankruptcy. Typically, NDC receives a daily update of the electronic files from the trustee. The electronic file updates provide trustee disbursement information, debtor remittance to trustee information, running total of claim balances, etc.

The system receives updated trustee disbursement information, borrower remittance information and running total of claim balances from NDC daily. As discussed before, the debtor remits payments to the trustee as determined by a court confirmed bankruptcy plan. The trustee, in turn, disburses the available debtor funds to the debtor's creditors in accordance with the confirmed plan. The trustee keeps a record of debtor remittance, disbursement of funds and the running total of claim balances. This information is electronically transmitted to NDC regularly and stored in NDC database.

The system matches data received from NDC with the data received from the loan servicer. The system uses weighted business rules to match the data. In one embodiment, the system compares the contents of a data field from NDC's record to the corresponding data field in the loan servicer's record to determine if the values match. As discussed before, the loan servicer's record includes the POC related information. The system assigns point values to the comparison rules depending on the importance of the data field. In other words, the point values assigned to the comparison rules vary depending on the data field. In one embodiment, the assigned score for the comparison is high if the data field is designated as having high importance, i.e. loan number. In contrast, the assigned score for the comparison is low if the data field is designated as having low importance.

In one embodiment, the assigned point value to a particular comparison rule may change depending on the loan servicer and the importance a particular loan servicer places on a particular data element (e.g., a particular loan servicer may not use certain data fields).

The data elements of the NDC records from the trustee are compared with the corresponding data elements of loan servicer's loan and claim information to determine if the data elements match. For example, if the account number or loan number of NDC's record matches exactly with the account number or loan number of the loan servicer's, a high point value is assigned. If the account number is redacted and only the last four digits are available and they match, a slightly lower point valued is assigned. If the last name of the debtor matches, the assigned point value is not as high because many debtors may have aliases when filing a bankruptcy petition, or a co-debtor may have filed.

One example of a weighted business rule: the loan number listed on the proof of claim on the NDC file should match the loan number listed in the loan servicer's file. If the loan numbers match, higher points are awarded than if only the last four digits of the loan numbers match.

Another example of the weighted business rule: the account number listed on the proof of claim on the NDC file should match the account number listed in the loan servicer's file. If the account numbers match completely, 200 points might be assigned. If only the last four digits of the account numbers match, only 80 points might be awarded. If no numbers match, 0 points might be awarded regarding account number.

The system calculates the sum total of the points awarded to a particular claim. If the sum total of the points awarded is greater or equal to a predetermined value, the claim is considered matched, and the claim is designated as being valid. If the sum total of the points awarded is less than the predetermined value, the claim is considered unmatched, and the claim is designated as being invalid.

In one embodiment, the system identifies certain claims for user exception review. If a claim, for example, is a possible match but is technically unmatched due to a low sum total score, that claim will be included in a list of claims for an exception review by a user. For example, an exception may be triggered for review as unmatched because the loan number did not match, but the creditor's name and a secured mortgage loan matched. The system allows the user to review the claims to determine if the claims are valid based on the information in the loan servicer's portfolio. If the user review indicates that the claim is valid, the user can note on the exception queue of the system manually to indicate that the match is correct and enter the claim in the system as being valid. If the match is not valid, the indication is made in the system.

After matching the NDC records with the loan servicer's records, the system identifies the matched claims and generates posting instructions for the payments that are remitted by the trustee. The posting instructions provide correct payment disbursement instructions to the loan servicer for the particular trustee payment received. The system compares the amount due on a claim per the confirmed plan and the remaining amount due on. The loan servicer does not have to spend time in order to determine correct disbursement amounts for one or more claims against the debtor.

Creditors sometimes amend the claims during the bankruptcy period. There are various reasons for amending a claim during the bankruptcy period. For example, a court entered agreed order conditioning a stay, or adding an additional post-petition debt to the plan may require an amendment. Also, an error discovered on the original pre-petition claim filed may require an amendment. Also, delinquent taxes paid after the bankruptcy filing, but are for taxes that were due prior to the bankruptcy, making them a pre-petition debt may require an amendment.

In one embodiment, the system provides updates for amended claims. As creditors submit amended claims to the court, they are in turn submitted to the designated trustee. The trustee enters the pertinent information from the amended claim into their system. The updated trustee information is provided to the NDC, which is subsequently transmitted to the system. Submission of the amended claim is also made by the loan servicer to the system via the daily file. As the amended claim is filed, the loan servicer updates their system with this information. This is in turn downloaded to the system as a daily change to a file.

In one embodiment, the system updates active and inactive cases. Active cases are bankruptcy cases where the debtor is still under the protection of the bankruptcy and over which the trustee still has jurisdiction for collection and distribution of debtor payments. Inactive cases are bankruptcy cases where the trustee no longer has jurisdiction for the collection and distribution of the debtor funds because the debtor was discharged or a new trustee was assigned to the case by the court.

In the case of a reassigned trustee, information from the new trustee would be fed to the NDC and the case would be active.

In one embodiment, the system identifies the discrepancies between the data fields in the NDC record and the loan servicer record. The system sends notifications to the trustee and the loan servicer about the discrepancies. For example, if the system determines through comparison of the loan servicer's data and the NDC's data that the loan servicer has an incorrect bankruptcy case number, an exception queue is generated to notify the loan servicer of the anomaly. If the system determines through comparison of the servicer's data and the NDC's data that the trustee is remitting to the servicer payment amounts that are not correct for post petition on-going monthly payments, the trustee will be notified of the error and will be advised of the correct remittance amount.

FIG. 1 is a flow diagram of the steps for electronic management and processing of bankruptcy-related claims in accordance with one example embodiment. In step 104, loan servicer data is received from the loan servicer portfolio. The loan servicer data relates to one or more loans in bankruptcy and one or more claims filed by creditors against the debtors.

In step 108, trustee data is received from a repository of trustee information. The trustee data relates to the servicer's loans in bankruptcy and relates to the claims filed by the creditors. In step 112, one or more data fields related to the claims from the loan servicer data are compared to corresponding one or more data fields related to the claims from the trustee data.

Figure 2:
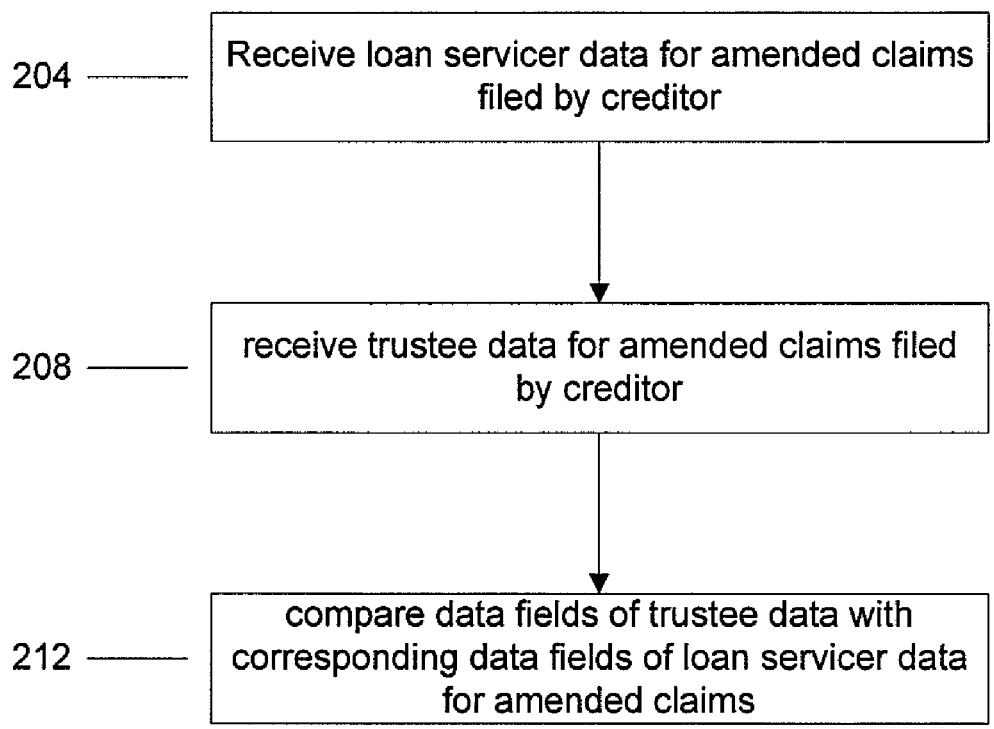
FIG. 2 is a flow diagram of several additional steps for electronic management and processing of bankruptcy-related claims and payments in accordance with one example embodiment.

FIG. 2 is a flow diagram of several additional steps for electronic management and processing of bankruptcy-related claims in accordance with one example embodiment. In step 204, loan servicer data for amended claims filed by the creditor is received from the loan servicer portfolio. The loan servicer data relates to one or more loans in bankruptcy and one or more amended claims filed by creditors against the debtors.

In step 208, trustee data is received from a repository of trustee information. The trustee data relates to servicer's loans in bankruptcy and related to the amended claims filed by the creditors. In step 212, one or more data fields related to the amended claims from the loan servicer data are compared to corresponding one or more data fields related to the amended claims from the trustee data.

Figure 3:
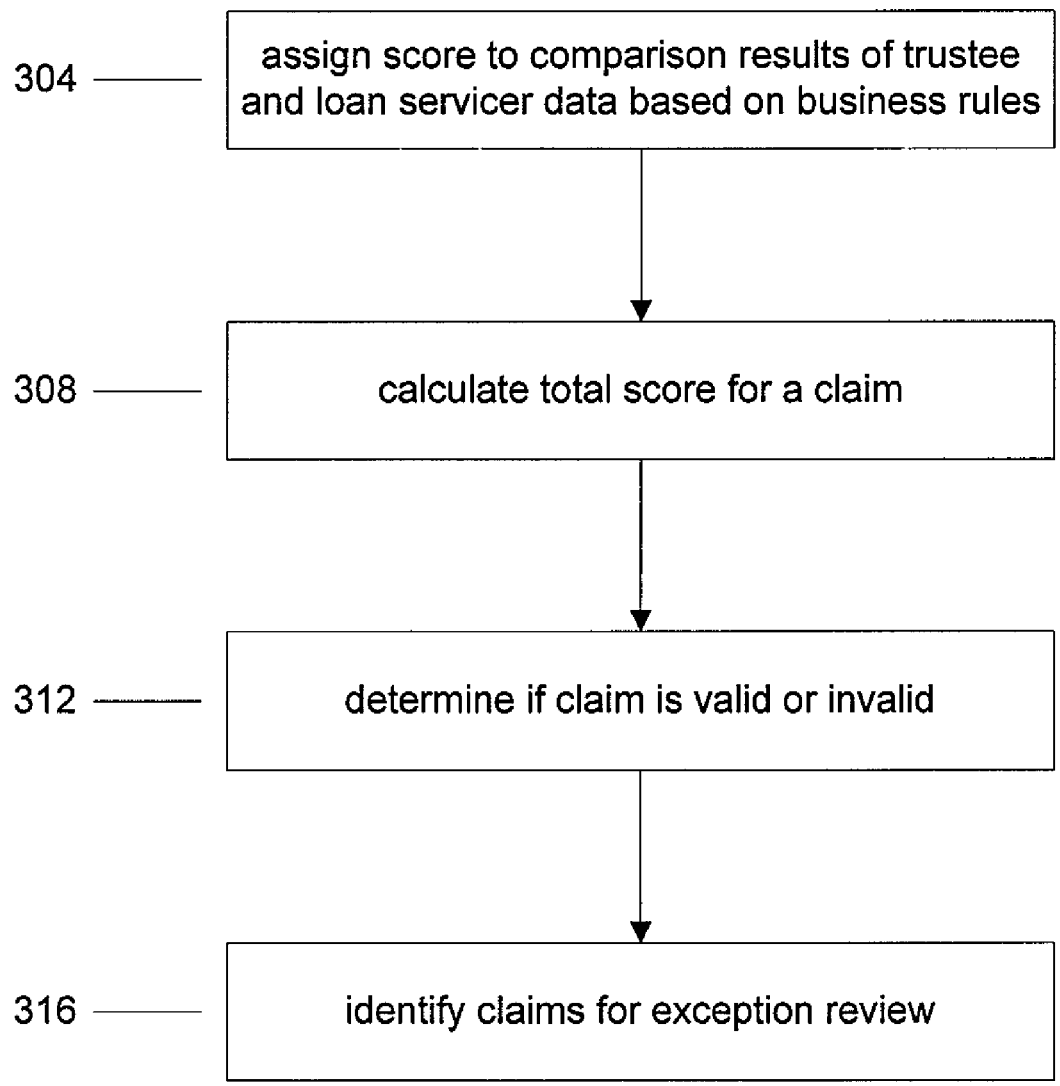
FIG. 3 is yet another flow diagram of several additional steps for electronic management and processing of bankruptcy-related claims in accordance with one example embodiment.

FIG. 3 is a flow diagram of several additional steps for electronic management and processing of bankruptcy-related claims in accordance with one example embodiment. In step 304, a score is assigned to the comparison results for the data fields related to the claims based on one or more business rules. In step 308, the total score is calculated for the comparison results for the claims. In step 312, if the total score for the claim is greater or equal to a predetermined value, the particular claim is designated as a valid claim. Otherwise the particular claim is designated as an invalid claim. In step 316, one or more invalid claims are identified for exception review. The claims selected for exception review achieved a low score but are a possible match.

Figure 4:
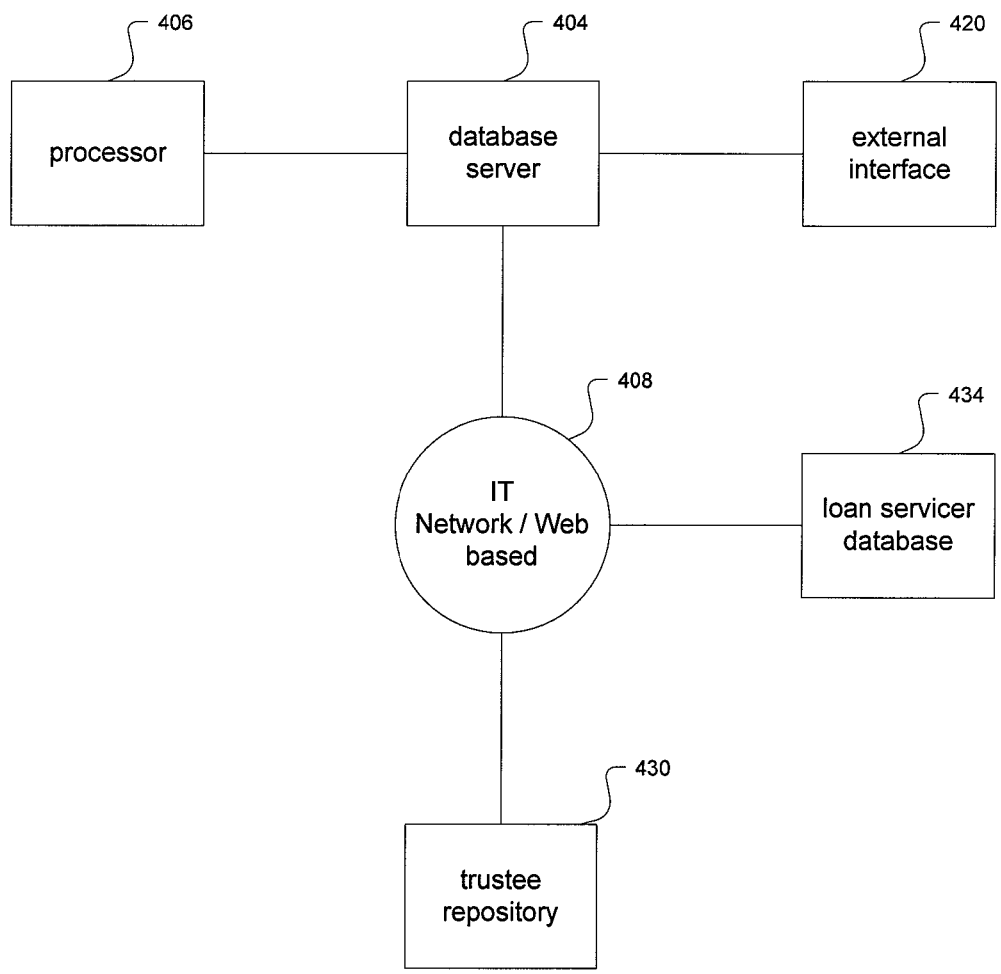
FIG. 4 illustrates a data processing system for electronic management and processing of bankruptcy related claims and payments in accordance with one embodiment.

FIG. 4 illustrates a data processing system 400 for electronic management and processing of bankruptcy related claims and payments in accordance with one embodiment. The system 400 includes a database server 404 that includes a processor 406. The database server 404 contains records of users and their access rights, such as those persons qualified to use the data processing system 400. The database server 404 also contains trustee data received from a trustee repository such as NDC. The trustee data includes debtor names, debtor social security numbers, claim balances, trustee names, claim numbers, etc.

The database server 404 also contains records received from the loan servicer database or portfolio. The loan servicer portfolio includes debtor names, debtor social security numbers, claim balances, creditor names, trustee names, etc. As discussed before, the data fields for a claim from the trustee data is compared to the corresponding data fields for the claim from the loan servicer data to identity one or more claims for a particular loan. When one or more claims are matched with a claim, the claims are designated as being valid. Otherwise, the claims are designated as being invalid or are queued for exception review.

The system 400 also includes an Information Technology (IT) Network 408, which includes network infrastructure required to maintain communication among the various components of the system 400 and the trustee depository 430 and the loan servicer database 434. The IT-Network 408 may include computers, printers, scanners, and document processing equipment required for automatically processing and generating documents related to the POCs, loans, debtors, creditors, and other bankruptcy related matters.

The system 400 also includes external interfaces 420, which are operative to interface with external entities, such as clients of a law firm, courts, financial institutions, government offices, as well as billing and archiving systems. The external interfaces 420 may allow for interfacing to external systems to be performed manually, with the help of data processing software, via Internet websites, or fully automatically with the use of 3rd party middleware software packages. In one particular example, through messaging and notification via external interfaces 420, the system 400 may respond to events that occur in a bankruptcy proceeding such as, for example, filing an amended claim by creditor.

As will be appreciated, the system 400 represents an architecture platform that is operative for enabling users to work in a paperless manner. The external interfaces 420 include modules for interfacing with external entities to enable document transfer. In one embodiment, the invention includes connectivity tools for interfacing through client middleware packages to provide information that triggers exception queues that can be downloaded through commercial middleware packages.

Although the present invention and its advantages have been described in detail, it should be understood that various changes, substitutions and alterations can be made herein without departing from the spirit and scope of the invention as defined by the appended claims. For example, while the invention has been described in relation to managing and processing bankruptcy related claims, it will become apparent to those skilled in the art that the invention can be adapted or altered to manage and process claims and case files related to other proceedings.

What is claimed is:

1. A method for electronic management and processing of bankruptcy-related claims and payments, comprising the steps of:

receiving, by a computer, loan servicer data from a loan servicer, the loan servicer data relating to one or more loans, including bankruptcy plan information, whose debtors are in bankruptcy and one or more claims filed by creditors against the debtors;

receiving trustee data from a repository of trustee information, the trustee data relating to the loans whose debtors are in bankruptcy and the claims filed by the creditors;

creating, by a computer, a relationship between the loan servicer data and the trustee data by comparing one or more data fields related to the claims from the loan servicer data to corresponding one or more data fields related to the claims from the trustee data;

assigning a score to the comparison results for the data fields related to the claims based on one or more business rules, wherein the assigned score for the comparison results is weighted depending on the data fields related to the claims;

calculating, by a computer, the total score for the comparison results for the claims;

designating the claim as being valid if the total score for the claim is greater or equal to a predetermined value; and designating the claim as being invalid if the total score for the claim is less than a predetermined value.

2. The method according to claim 1 further comparing a loan number for a selected claim from the loan servicer data to a corresponding loan number for the selected claim from the trustee data.

3. The method according to claim 1 further comprising comparing a debtor name for a selected claim from the loan servicer data to a corresponding debtor name for the selected claim from the trustee data.

4. The method according to claim 1 further comprising comparing a debtor social security number for a selected claim from the loan servicer data to a corresponding debtor social security number for the selected claim from the trustee data.

5. The method according to claim 1 further comprising comparing a claim amount for a selected claim from the loan servicer data to a corresponding claim amount for the selected claim from the trustee data.

6. The method according to claim 1 further comprising comparing a creditor name for a selected claim from the loan servicer data to a corresponding creditor name for the selected claim from the trustee data.

7. The method according to claim 1 further comprising comparing a bankruptcy number for a selected claim from the loan servicer data to a corresponding bankruptcy number for the selected claim from the trustee data.

8. The method according to claim 1 further comprising comparing a trustee name for a selected claim from the loan servicer data to a corresponding trustee name for the selected claim from the trustee data.

9. The method according to claim 1 wherein the loan servicer data includes data from a proof of claim (POC) filed by the creditors against the debtor.

10. The method according to claim 1, further comprising identifying one or more claims against a particular loan based on the comparison results.

11. The method according to claim 1 wherein the trustee data is received from a commercially available database, the commercially available database being a repository of trustee data.

12. The method according to claim 1 wherein the assigned score for the comparison varies depending on the data fields related to the claims.

13. The method according to claim 12 wherein the assigned score for the comparison results is high if the data field is a loan number.

14. The method according to claim 1 further comprising changing the assigned score for the comparison results.

15. The method according to claim 1 further comprising: storing the service provider data into a server.

16. The method of claim 1 further comprising generating payment instructions for the valid claims.

17. The method of claim 1 further comprising:
generating payment instructions for the valid claims; and
providing the payment instructions to the loan servicer.

18. The method of claim 1 further comprising receiving trustee data related to amended claims, wherein the amended claims are filed by the creditors.

19. The method of claim 1 further comprising identifying one or more claims for exception review, wherein the claims selected for exception review achieves a low score.

20. A computer-readable non-transitory storage medium including instructions for controlling a computer system to perform a method for electronic management and processing of bankruptcy-related claims and payments, comprising the steps of:

receiving loan servicer data from a loan servicer, the loan servicer data relating to one or more loans whose debtors are in bankruptcy and one or more claims filed by creditors against the debtors;

receiving trustee data from a commercially available repository of trustee information, the trustee data relating to the loans whose debtors are in bankruptcy and the claims filed by the creditors;

creating a relationship between the loan servicer data and the trustee data by comparing one or more data fields related to the claims from the loan servicer data to corresponding one or more data fields related to the claims from the trustee data;

assigning a score to the comparison results for the data fields related to the claims based on one or more business rules, wherein the assigned score for the comparison results is weighted depending on the data fields related to the claims;

calculating the total score for the comparison results for the claims;

designating the relationship as matched and the claim as being valid if the total score for the claim is greater or equal to a predetermined value;

designating the relationship as unmatched and the claim as being invalid if the total score for the claim is less than a predetermined value.

21. The computer-readable non-transitory storage medium of claim 20 further comprising generating payment instructions for the valid claims, the payment instructions including trustee disbursement information and instructions on how to apply funds to the creditor's account.

22. The computer-readable non-transitory storage medium of claim 20 wherein the commercially available repository of trustee information is a database of trustee information from the National Data Center.

* * * * *